Oct. 29, 1968     K. W. HEMPHILL     3,408,140
DOCUMENT HANDLING APPARATUS
Filed Feb. 21, 1966     5 Sheets-Sheet 1

INVENTOR.
KENT W. HEMPHILL
BY
ATTORNEYS

INVENTOR.
KENT W. HEMPHILL

INVENTOR.
KENT W. HEMPHILL
ATTORNEYS

Oct. 29, 1968　　　K. W. HEMPHILL　　　3,408,140
DOCUMENT HANDLING APPARATUS
Filed Feb. 21, 1966　　　5 Sheets-Sheet 4

INVENTOR.
KENT W. HEMPHILL
BY
ATTORNEYS

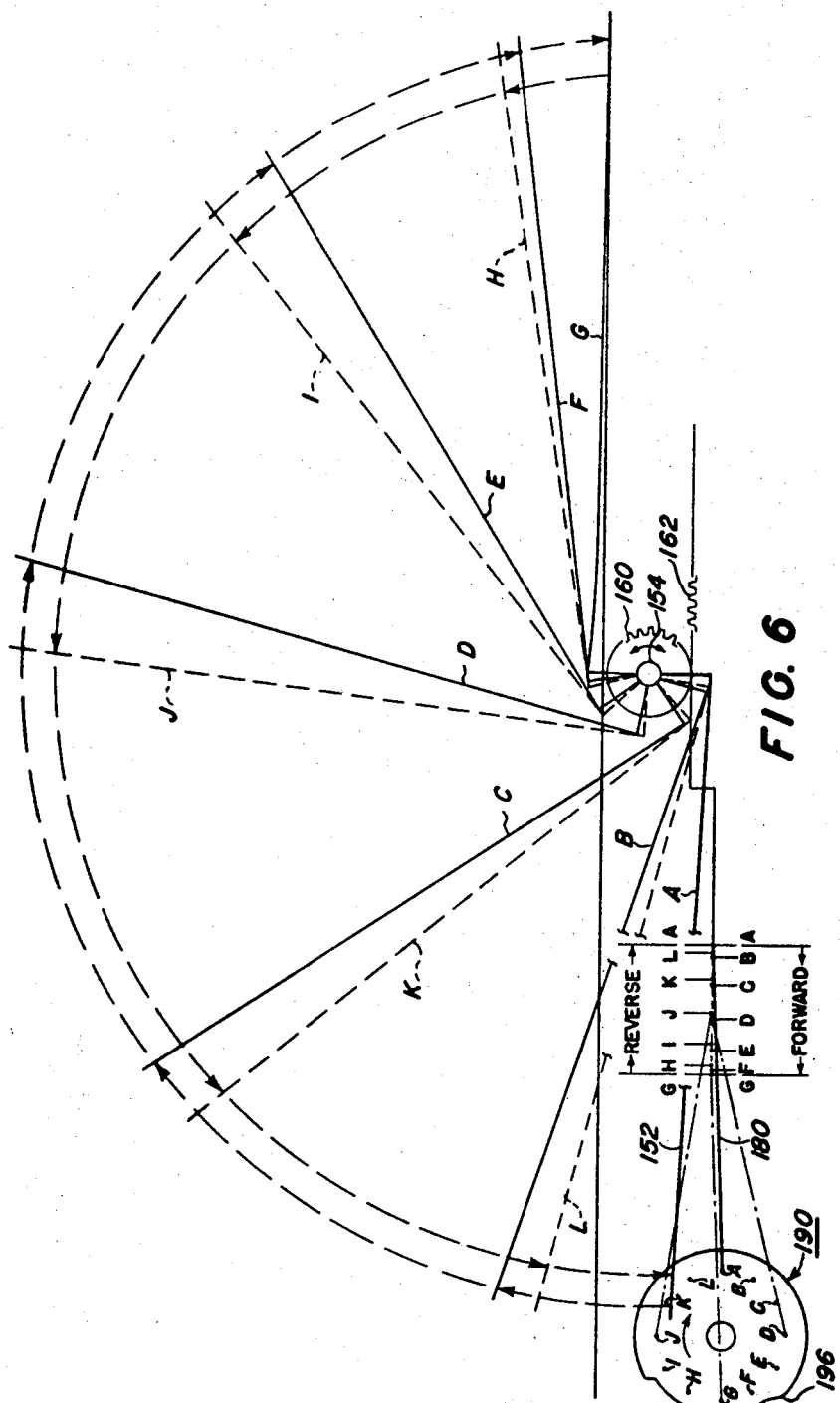

United States Patent Office 3,408,140
Patented Oct. 29, 1968

3,408,140
DOCUMENT HANDLING APPARATUS
Kent W. Hemphill, Rochester, N.Y., assignor to Xerox Corporation, Rochester, N.Y., a corporation of New York
Filed Feb. 21, 1966, Ser. No. 528,845
11 Claims. (Cl. 355—23)

This invention relates to graphic recording and more particularly to apparatus for rapidly handling document information to be recorded on two sides.

The widely accepted use of microfilm as a means for storing information has not only increased the use of microfilm but has also increased the need for expediting the handling of information to be recorded onto the microfilm. Presently where it is desired to record, for example, a text in numerical sequences tedious and time consuming adjustments must be made to position each document from the text at an exposure station for recording on a first side and then to invert and reposition the document for recording on a second side until the entire text has been recorded. When it is considered how many exposures must be made in producing a single recording of a text having several hundred pages, the need for a document handler that is able to rapidly transport documents to and from an exposure station as well as invert the documents for recording on a second side becomes increasingly apparent.

Now in accordance with the present invention text documents may be recorded in proper sequence with a minimum of delay. Generally speaking the invention utilizes a continuously moving conveyor to transport each document past a first gate which acts to arrest the document at the exposure position for recording on a first side. Still another gate in the flow path serves to arrest the document in a second position from where it is inverted and returned to the exposure position by a document turner for recording on a second side. Thus both sides of the document are recorded in rapid sequence.

It is therefore an object of this invention to provide novel apparatus for handling documents to be recorded on two sides in rapid sequence whereby an entire text can be copied in a time much briefer than heretofore.

It is also an object of this invention to provide apparatus for inverting and repositioning documents transported past an exposure station on a continuously moving conveyor for exposure on a second side.

These and other features and objects of the invention will be apparent from the following description and from the drawings in which:

FIG. 6 illustrates the various positions of the document inverter during operation.

Figure 1:
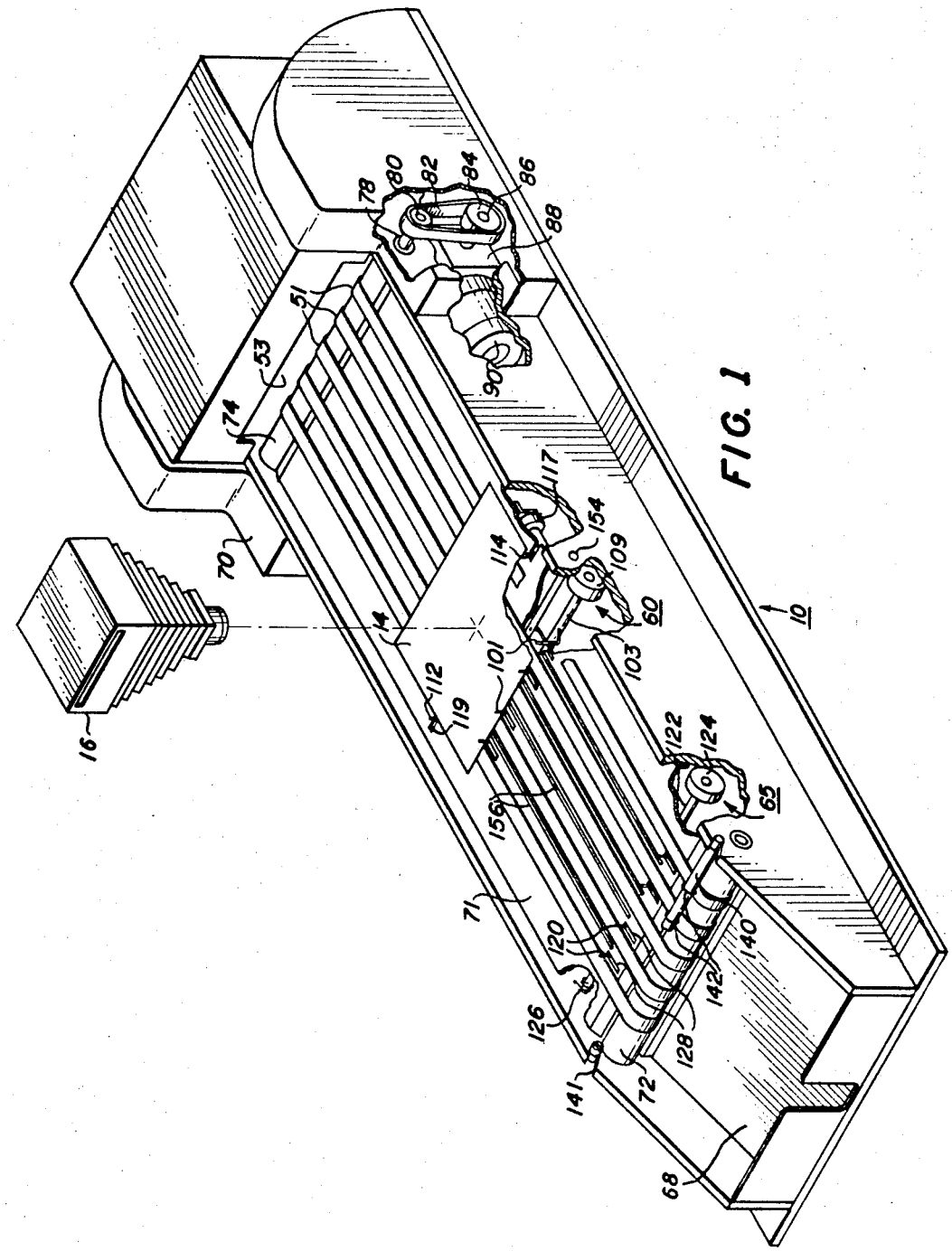
FIG. 1 is a perspective view of the document handler assembly supporting a document in the exposure position.

Referring now to FIGURE 1 there is shown a document handler assembly generally designated 10 supporting a document 14 in the exposure position for recording by a microfilm camera 16 or the like. To accomplish this a plurality of endless belts 51 receive document 14 through a feed slot 53 and advance it to a recording position abutting a depressable gate 60. After recording a first side, the document is advanced to a second position abutting depressable gate 65 from where it is repositioned and inverted for recording on a second side as will be understood. When document 14 has had both sides recorded it is deposited in an output tray 68 and the next document is introduced onto continuously moving belts 51 through slot 53 by a document feeder, not shown. Any suitable document feeder mechanism may be used for this purpose, such as, a commercially available top feeding vacuum lift-off type, as this does not form a part of the present invention.

As shown in the figure document handler assembly 10 comprises a housing 70 having a platen 71 for providing intermediate support to the horizontally spaced endless belts 51 which are mounted on a pair of spaced apart parallel rollers 72 and 74. Movement is imparted to the belts by roller 74 which is driven by a coaxially mounted drive shaft 78 having a pulley 80 mounted at one end thereof. Pulley 80 is driven by a belt 82 which is drivingly connected to a pulley 84 mounted on an output shaft 86 of a gear reducer 88 that has an input from a D.C. motor 90. In this manner, power from motor 90 provides a continuous smooth motion to endless belts 51.

Figure 2:
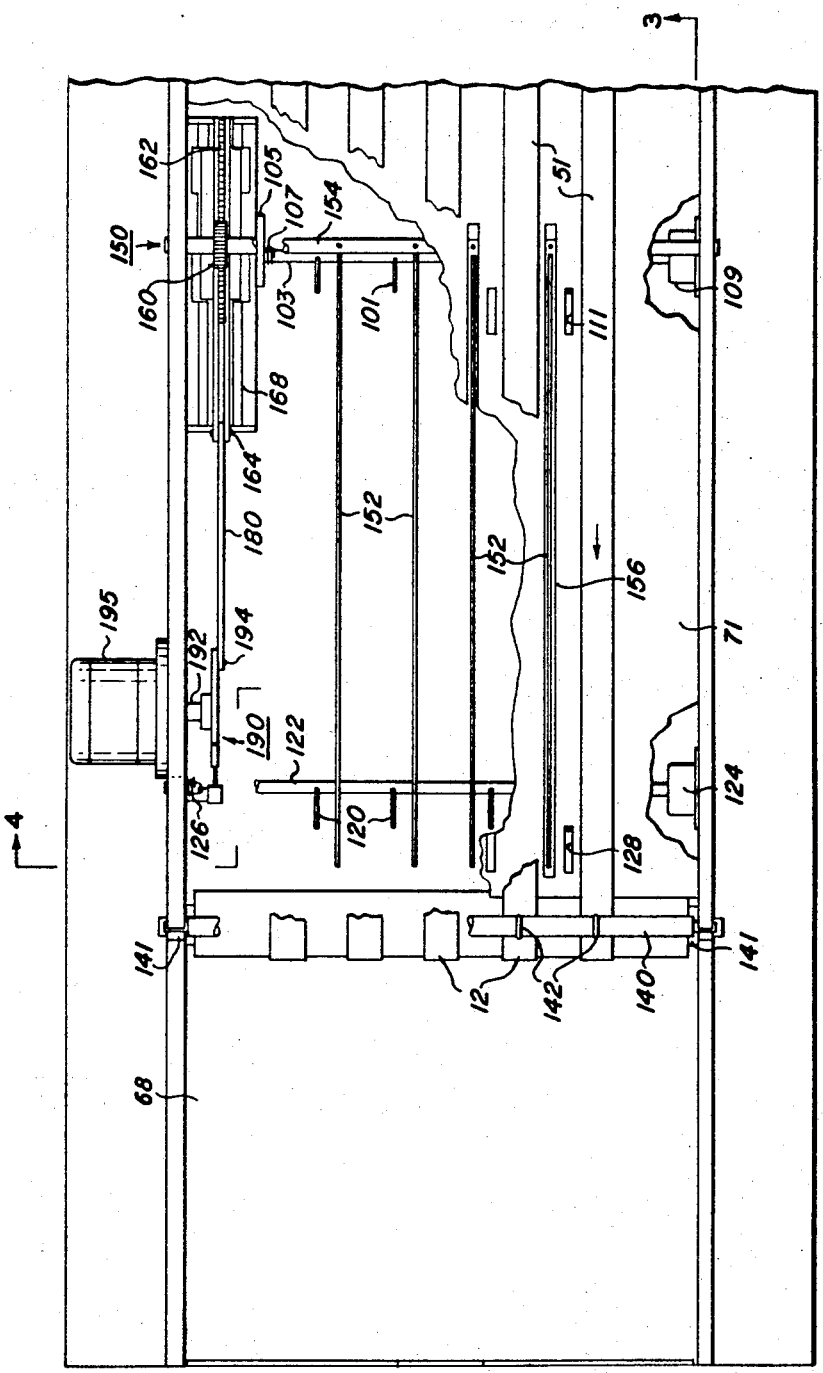
FIG. 2 is a plan view of the document handler assembly shown in FIG. 1.
Figure 3:
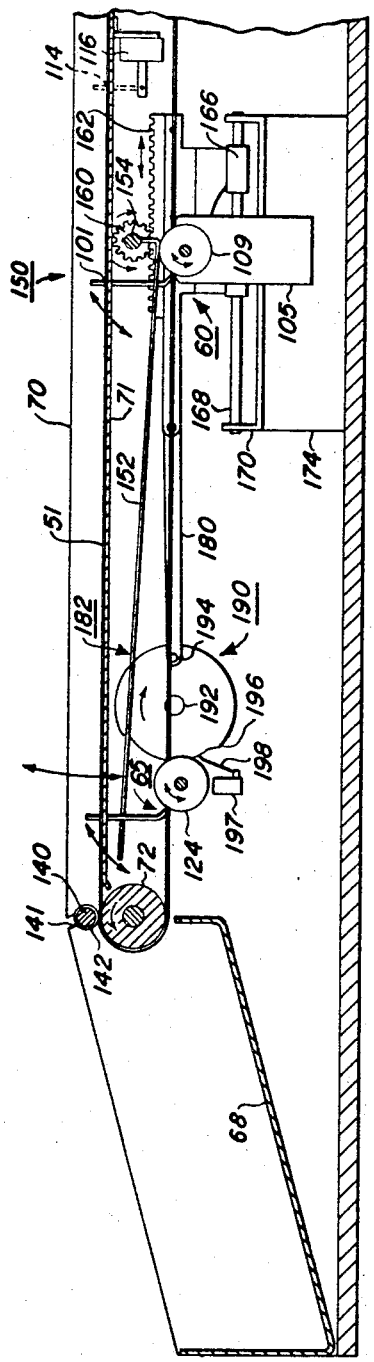
FIG. 3 is a side elevation view taken along line 3—3 of FIG. 2.
Figure 4:
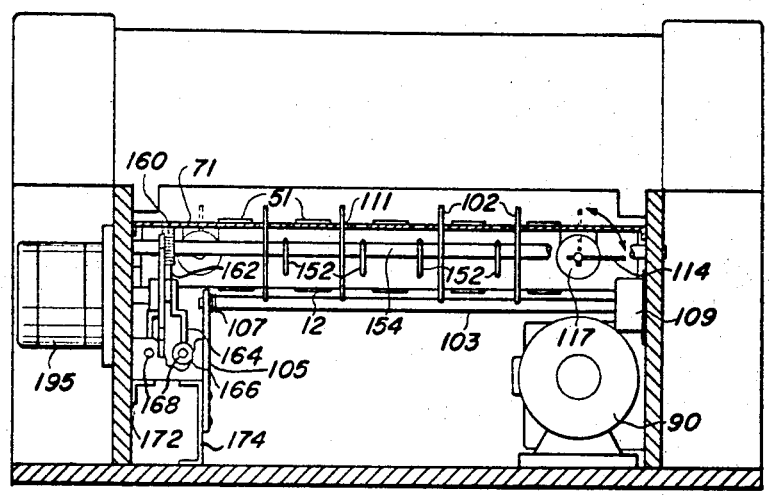
FIG. 4 is an end view taken along line 4—4 of FIG. 2.

To provide effective document registration at the recording position, gate 60 is provided with a plurality of spaced pins 101 connected to shaft 103 that is mounted for rotation within housing 70 on a support plate 105 as best seen in FIGURES 2, 3, and 4. Shaft 103 is urged by a spring 107 connected to housing 70 such that pins 101 normally extend in the vertical position above platen 71. A rotary solenoid 109, when energized, serves to rotate shaft 103 against the bias of spring 107 thereby depressing pins 101 below the surface of platen 71. Slots 111 are provided in platen 71 for receiving pins 101 therethrough. Upon deenergizing solenoid 109, pins 101 are restored to their normal position above platen 71 due to the biasing action of spring 107.

A pair of rods 112 and 114 are located adjacent gate 60 for centering the document 14 as it approaches the recording position. Solenoids 116 and 117 (see FIGURE 4) may be used to actuate the rods in a manner already described through slots 119 in platen 71. If desired platen 71 may be constructed as a vacuum platen, with a suitable vacuum source and slots located adjacent gate 60 to provide additional restraint upon the document in the recording position.

Gate 65, which is similar in operation to gate 60, comprises a plurality of spaced pins 120 connected to a shaft 122 rotatably journaled within housing 70 and driven by a rotary solenoid 124 against the biasing of spring 126. Thus, when solenoid 124 is activated the normal tension of spring 126 is overcome and pins 120 are depressed through slots 128 below platen 71 permitting the document to pass into output tray 68. A floating pinch roller 140 supported for rotation in slots 141 at the end of housing 70 acts to direct the document downwardly into tray 68. To facilitate this action, a plurality of rubber O-rings 142 are mounted on the pinch roller in alignment with each of the transport belts 51 so that firm contact may be had on the document during transport into the tray.

To record both sides of the document in rapid sequence, a document turner generally designated as 150 is also provided on document handler assembly 10. The document turner consists of elongated fingers 152 connected at one end to a shaft 154 that is mounted for rotation to move the fingers clockwise in an arc of approximately 180° and then counter-clockwise thereby effecting the desired inversion of the document. Elongated slots 156 are located in platen 71 intermediate belts 51 to allow fingers 152 of the document turner to lift the document from the belts and flip it on its back before returning to an original starting position below the platen.

To accomplish this movement, shaft 154 has mounted at one end thereof a pinion gear 160 which meshes with a reciprocating fine pitch rack 162 to effect rotation of the pinion in first a clockwise and then a counterclockwise direction. Rack 162 is mounted for linear motion on a pair of spaced apart plates 164 which terminate in cylindrical linear bearing housings 166 that journal a pair of spaced apart parallel guide rods 168. Guide rods 168 are supported by a plate member 170 which is secured to housing 70 by angle brackets 172 and 174. A connecting rod 180 serves to couple spaced apart plates 164 with a driving crank assembly generally designated as 182. In this manner, a reciprocating motion is imparted to plates 164 so that a rotary motion may in turn be imparted to pinion 160 and hence to fingers 152 of the document turner 150.

To effect the desired smooth rotary movement to fingers 152 of the document turner 150, driving crank assembly 182 consists of a cam disk 190 which is mounted for rotation about a shaft 192. A crank pin 194 radially spaced from the center of cam disk 190 serves to drive connecting rod 180 in a cranking motion upon rotation of shaft 192 by a drive motor 195. To enhance the smoothness of operation, cam disk 190 has a profile 196 about the periphery thereof which serves to selectively control the power to motor 195 through a microswitch 197 by tripping a follower arm 198 thereby permitting the document turner fingers to coast into their rest position below platen 71.

Figure 5:
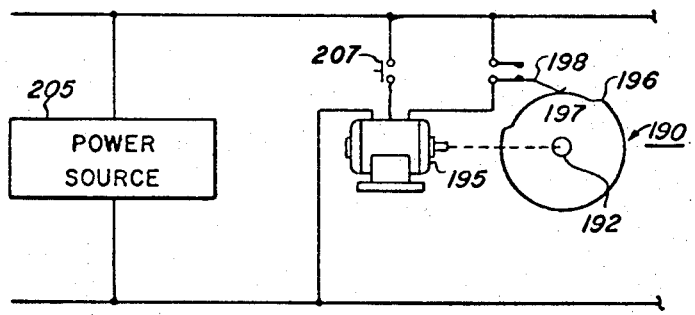
FIG. 5 is a schematic view illustrating the drive of the document inverter.

As best shown in FIG. 5, the drive motor 195 for rotating shaft 192 is energized from a power source 205 via microswitch 197. Alternatively, power may be supplied by manual actuation of a switch 207. Switch 207 is closed momentarily to start rotation of disk 190. This causes the disk to rotate sufficiently so that the raised portion of profile 196 on the periphery of the disk urges follower arm 198 to close microswitch 197 thereby maintaining power to motor 195. When microswitch 197 opens, disk 190 comes to a stop gradually due to its own inertia. As can readily be appreciated, this same type of movement is imparted in turn to rack 162 and fingers 152 of the page turner so that for each cycle of document reversal, fingers 152 glide smoothly into their normal position below platen 71.

In FIG. 6 there is shown various positions A through L of the fingers 152, connecting rod 180, and disk 190 of the document turner mechanism. As shown, in starting position A, the fingers of the document turner are slightly below the horizontal transport plane of the document handler and the connecting rod is all the way to the right when looking at the figure. Upon clockwise rotation of the disk to position B, the connecting rod is pulled to the left advancing the flipper fingers above the horizontal thereby lifting document 14 from transport belts 51. In position C, the connecting rod is still further to the left as the fingers approach the vertical position D. At this position the document is held against the rapidly turning fingers by aerodynamic forces, and will cling to the fingers which are now advancing at maximum velocity. Upon further rotation of the disk, the connecting rod moves through positions E and F to its furthermost position G on the left which corresponds to about a 180° rotation of the fingers. Thus as the document approaches the horizontal plane, deceleration forces act upon the turning fingers, allowing the document to settle onto the platen. In this manner a positive control over the document is maintained at all times. Upon further rotation of the disk, the connecting rod moves from left to right thereby reversing the direction of rotation of the fingers through positions H and I to position J where the fingers are at approximately the vertical position again. By this time, the cam profile 196 on the disk is such that a recess which covers approximately 90° is passing adjacent follower arm 198 thereby opening microswitch 197 and deenergizing the motor 195. This allows the document turner to be brought to a gliding rest through positions K and L to position A just slightly below the horizontal from which the action started.

By the apparatus described above there has been disclosed a document handler admirably suited for the mass production of texts onto microfilm or the like. Heretofore it has not been possible to record a text in numerical sequence without painstakingly inverting each document from the text for exposure on a second side. Now in accordance with the present invention documents are supplied to the recording station on a continuously moving conveyor and inverted for recording on both sides without altering the movement of the conveyor or otherwise interfering with the recording cycle. Hence high quality recordings can be produced with a minimum of delay.

While the present invention as to its objects and advantages as described herein has been carried out in a specific embodiment thereof, it is not desired to be limited thereby, but it is intended to cover the invention broadly within the spirit and scope of the appended claims.

What is claimed is:

1. In a document recording unit in which documents are transported to an exposure position relative to a recording medium, document inverting apparatus for effecting placement of a second side of a document at said exposure position, said apparatus comprising in combination:
   first gate means in the transport path to arrest a document at said exposure position;
   second gate means in the transport path past said first gate means to arrest a document thereat to be inverted and
   lift means intermediate said first and second gate means operative to lift a document from the transport path and return it inverted to the transport path at least behind said first gate means.

2. Apparatus according to claim 1 wherein said lift means includes:
   a shaft rotatably journaled beneath the transport path
   a plurality of elongated fingers secured at one end to said shaft
   a reciprocable gear rack connected to said shaft operative when reciprocated to effect rotation of said shaft, and
   drive means connected to said rack to effect a reciprocating movement thereof.

3. Apparatus according to claim 2 wherein said drive means includes a camming surface and switch means responsive to said camming surface operative to disconnect the rotational drive to said shaft while said fingers are moving at substantially maximum velocity toward their starting position.

4. Apparatus for recording information on both sides of a document in rapid sequence comprising:
   conveyor means for transporting a document to be recorded;
   means for continuously driving said conveyor means;
   first gate means in the transport path to arrest the document at an exposure position relative to a recording medium;
   means for recording the document onto the recording medium when in the exposure position;
   second gate means in the transport path past said first gate means to arrest a document thereat having had a first surface recorded; and
   lift means intermediate said first and second gate means operative to lift the document from the transport path and return it inverted to the transport path at least behind said first gate means.

5. Apparatus according to claim 4 wherein said lift means includes:
   a shaft rotatably journaled beneath the transport path
   a plurality of elongated fingers secured at one end to said shaft
   a reciprocable gear rack connected to said shaft operative when reciprocated to effect rotation of said shaft, and
   drive means connected to said rack to effect a reciprocating movement thereof.

6. Apparatus according to claim 5 wherein said drive means comprises a rotatable disk having a cam profile, a motor drivingly connected to said disk, a follower arm engaging said cam profile, and switching means coupling a power source to said motor and operative by the actuation of said follower arm to provide a predetermined intermittent energization of said motor.

7. Apparatus according to claim 4 wherein said conveyor means includes a plurality of spaced apart endless belts.

8. Apparatus according to claim 7 wherein at least one of said gate means includes a plurality of parallel pins secured at one end to a shaft rotatably journaled beneath the surface of said belts and positioned along the shaft to correspond to spaces between said belts.

9. The apparatus of claim 1 including means for centering a document at said exposure station.

10. The apparatus of claim 9 wherein said centering means comprises a pair of guide rods positioned adjacent said first gate means and actuable for movement transverse of the transport path to center a document at said exposure position.

11. The apparatus of claim 9 wherein said means for centering a document at said exposure station is actuable upon a document engaging said first gate means.

References Cited
UNITED STATES PATENTS 3,288,464  11/1966  Thompson _____ 88—24 X NORTON ANSHER, *Primary Examiner.*